United States Patent

Kupersmith et al.

[11] Patent Number: 5,771,277
[45] Date of Patent: Jun. 23, 1998

[54] ELEVATOR CAR MODEM WITH TRANSHYBRID REJECTION

[75] Inventors: Bertram F. Kupersmith, Avon; Julian H. Shull, Jr., Southington, both of Conn.

[73] Assignee: Otis Elevator Company, Farmington, Conn.

[21] Appl. No.: 519,214

[22] Filed: Aug. 25, 1995

[51] Int. Cl.$^6$ .................................................. H04M 11/00
[52] U.S. Cl. ...................... 379/93.05; 379/406; 379/410; 375/222
[58] Field of Search .................... 375/219–222; 379/90, 93, 98, 403, 406, 410, 90.01, 93.01, 93.05, 93.26, 93.37

[56] References Cited

U.S. PATENT DOCUMENTS 4,331,842  5/1982  Kiko ........................................ 379/406
5,271,060  12/1993  Moran, III et al. ..................... 379/403
5,504,778  4/1996  Carriere .................................. 379/406

Primary Examiner—Curtis Kuntz
Assistant Examiner—Stephen W. Palan

[57] ABSTRACT

A telephone transmit circuit is connected through a resistor to a junction at which a telephone line interface circuit is connected, a transhybrid cancellation circuit is connected to the transmit circuit and includes a high frequency shunt matching network having capacitive and inductive components and a low frequency matching circuit which comprises a lead lag network having capacitive components, the output of the transhybrid circuit being connected to a summing junction at the input of a telephone receiver. The other input of the summing network is connected between the resistor and the interface circuit, whereby a portion of the transmit signal is fed back out of phase to the receive amplifier so as to cancel out undesirable side tones, across a predetermined frequency range.

9 Claims, 2 Drawing Sheets

5,771,277

ELEVATOR CAR MODEM WITH TRANSHYBRID REJECTION

TECHNICAL FIELD

This invention relates to voice communication in an elevator car and more particularly to transhybrid rejection in a modem connecting an elevator car intercom to a telephone line.

BACKGROUND OF THE INVENTION

In telephone communication systems, the "hybrid" is the device or circuit in a telephone or modem circuit that converts four-wire signals to a two-wire network. The four-wire signals are transmit and receive for voice and/or data (each with their own individual or common returns) and the two-wire telephone network which consists of two wires usually referred to as "tip" and "ring."

When voice or data is transmitted from a telephone or modem, it is presented to the transmit network which places it on the telephone network. When voice or data is received, the receive network senses the received signal on the telephone network and passes it to the telephone receiver or modem. When voice or data is transmitted however, a signal is induced across the telephone line which is also received back by the receive network, i.e., the receive network is picking up part of the transmit signal. Transhybrid rejection is the ability of the receive network to cancel out this induced signal that the transmit network is placing on the telephone network.

In older telephones, the hybrid was a complex transformer with several windings. Both the four-wire to two-wire interface and the transhybrid cancellation were achieved in the magnetics of this transformer. In present designs, these functions are accomplished using electronics. Transhybrid rejection is achieved by matching gains in the operational amplifiers of the hybrid and then summing the signals out of phase so that they cancel. Due in part to the complex elements in the telephone line interface circuit and loads, transhybrid rejection is often only adequate over a narrow frequency range.

In providing voice communication to an elevator car, a high transhybrid rejection is required to interface the in-car voice intercom to the telephone network. Where a voice operated switch, such as a speakerphone integrated circuit (I.C.), is utilized, high transhybrid rejection is necessary to provide the attenuation required between transmit and receive to ensure proper switching of the voice operated switch. Where an on-line full duplex intercom is used without a voice operated switch, high transhybrid rejection is necessary to prevent acoustic feedback. Accordingly, it is desirable to provide a hybrid circuit with high transhybrid rejection over a frequency range sufficient for voice intercom communications to an elevator car.

DISCLOSURE OF THE INVENTION

It is an object of the present invention to provide a new and improved modem which achieves high transhybrid rejection over a frequency range sufficient for voice intercom to an elevator car.

Another object of the invention is to provide such a modem which is economical to manufacture and easily adaptable to the telephone line characteristics of many countries.

Other objects will be in part obvious and in part pointed out more in detail hereinafter.

Accordingly, it has been found that the foregoing and related objects are attained and the disadvantages of the prior art are overcome in a modem for connection to a telephone line having a transmit circuit, a receive circuit, a telephone line interface circuit and a transhybrid cancellation circuit. The telephone line interface circuit interconnects the transmit circuit and the receive circuit to a telephone line and comprises first and second groups of reactive circuit components. The transhybrid cancellation circuit has a first low frequency circuit configured to simulate the first group of reactive components of the interface circuit over a predetermined low frequency range to provide transhybrid rejection over the low frequency range. The transhybrid cancellation circuit also has a second high frequency circuit configured to simulate the second group of reactive components of the interface circuit and a connected telephone line over a predetermined high frequency range to provide transhybrid rejection over the high frequency range.

BEST MODE FOR CARRYING OUT THE INVENTION

Figure 1:
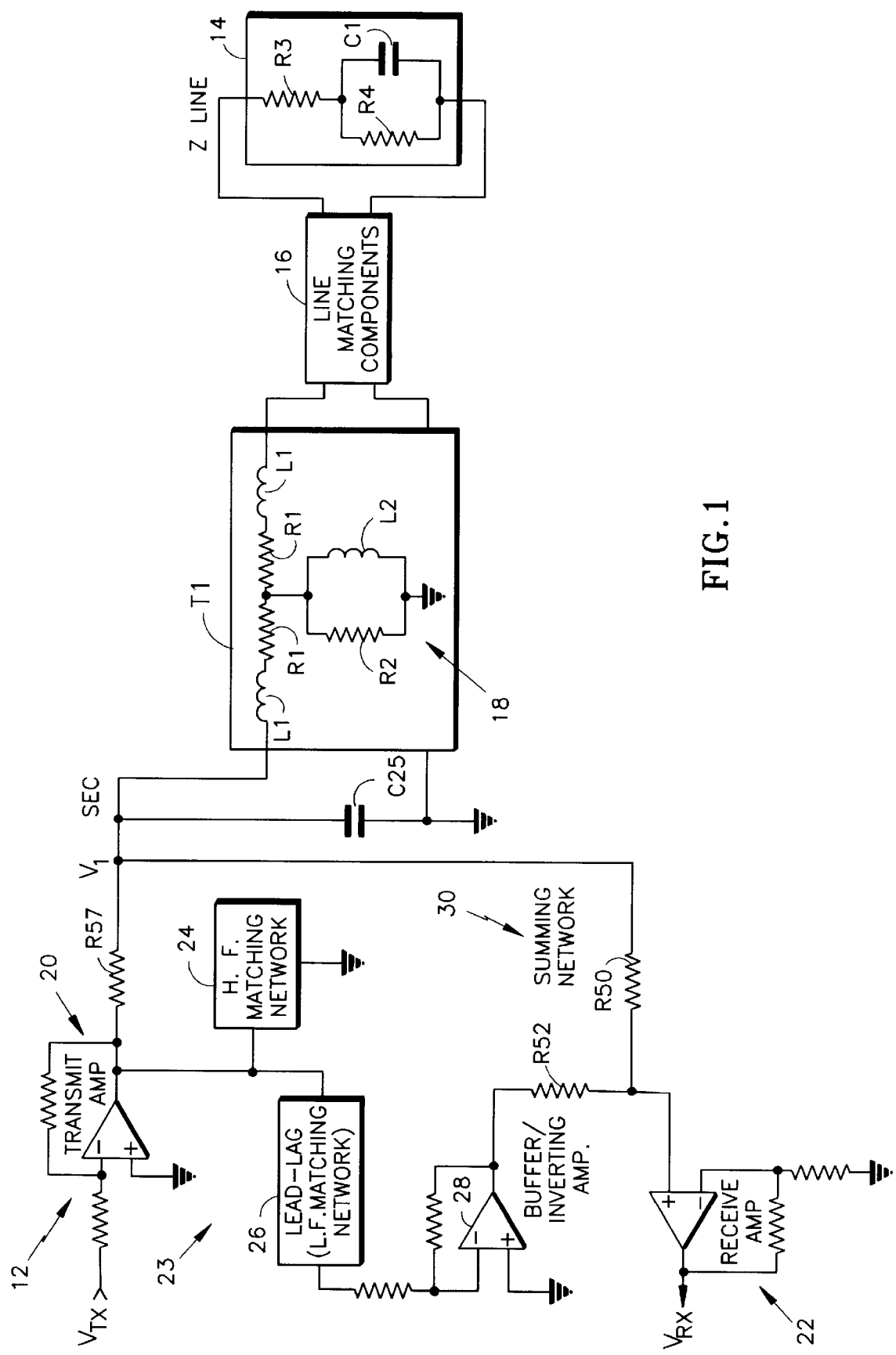
FIG. 1 is a block diagram of a telephone modem according to the present invention.

Although specific forms of the present invention have been selected for illustration in the drawings, and the following description is drawn in specific terms for the purpose of describing these forms of the invention, the description is not intended to limit the scope of the invention which is defined in the appended claims.

Referring to the block diagram of FIG. 1, the hybrid circuit 12 of the present invention is connected to a telephone line 14 through isolation and line matching components as required by the telephone line provider. For purposes of explanation, the reactive components of the telephone line are identified in the model telephone line circuit 14. The line matching-isolation components comprise matching resistor R57, shunt capacitor C25, isolation transformer T1 and line matching circuit 16. For ease of reference, the line matching-isolation components may be collectively referred to as the "interface circuit" or "interface components."

The transformer T1 is a low current, 1:1 ratio, signal transformer particularly adapted for interfacing telephone networks and for purposes of explanation is shown as model transformer circuit 18. The transformer circuit 18 comprises series inductors L1, shunt inductor L2, resistors R1 and resistor R2. Resistors R1 represent the winding losses and resistor R2 represent the core losses of the transformer. Inductors L1 represent the leakage inductance and inductance L2 represents the magnetizing inductance of the transformer.

Figure 2:
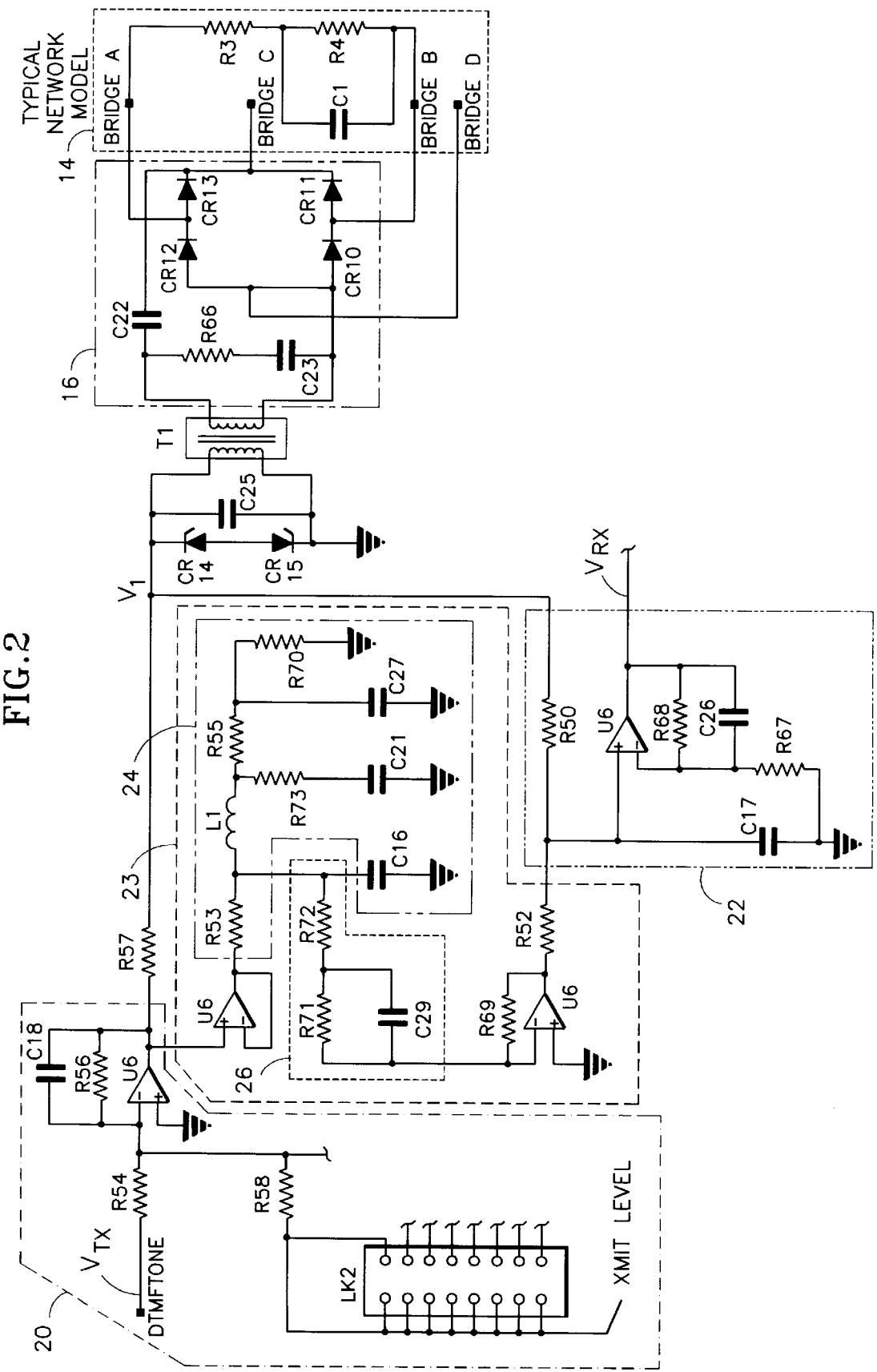
FIG. 2 is a detailed schematic diagram of a modem according to the present invention.

Referring to FIG. 2, the line matching circuit 16 comprises resistor R66, capacitor C22, capacitor C23 and capacitor C24. The capacitors C23, C24, C25 and resistor R66 are used to balance out the inductances in transformer T1 so that it doesn't look like a transformer to the telephone line. The capacitor C22 is a DC blocking capacitor to prevent DC from flowing through the transformer T1.

The model telephone line circuit 14 comprises resistor R3, resistor R4 and capacitor C1. The requirements of the interface circuit and the specification of the telephone line are determined by telephone line providers and may vary from country to country.

The hybrid circuit 12 generally comprises a transmit amplifier circuit 20 and a receive amplifier circuit 22 connected by a transhybrid circuit 23. The transhybrid circuit 23 generally comprises a shunt connected high frequency matching circuit (or network) 24, a low frequency matching circuit 26 or network, and a buffer-inverting amplifier 28, feeding a summing circuit 30 at the input of the receive amplifier circuit 22.

When transmitting, a signal from $V_{TX}$ is sent through the transformer T1 and line matching circuit 16 to the telephone line 14 for transmission thereon. When a signal is received from the telephone line 14, the received signal passes back through the line matching circuit 16 and transformer T1 and receive amplifier 22 so that the receive signal is seen at $V_{RX}$. However, when the signal transmitted from $V_{TX}$ through the transmit amp 20 produces a signal across the telephone line 14, this signal across the telephone line also causes a voltage at $V_{RX}$ which is referred to as sidetone. The transhybrid cancellation circuit 23 functions to feed back a portion of the transmit signal into the receive amplifier so as to cancel out the undesirable sidetone. In order to cancel out the sidetone over an extended frequency range, the response curve of the transhybrid rejection circuit must approximate the response curve of the combination of the telephone line and the interface components. Referring to the voltage reference point $V_1$ for purposes of explanation, the voltage induced by the telephone line and interface components at VI as a result of a transmit signal is ideally to be canceled out at the summing network 30 by the portion of the transmit signal passing through the transhybrid rejection circuit 23.

In order to approximate the response curve of the telephone line and interface components, the low frequency network 26 is configured to simulate or match the reactive components of the telephone line and interface components from approximately several hertz up to 500 Hz (low frequency range) and the high frequency matching network 24 is configured to simulate or match the reactive components from approximately 500 Hz up to 3500 Hz (high frequency range).

Referring to FIG. 2, representative component values are shown for the telephone system of the United Kingdom for purposes of explanation. It is to be understood that the telephone line component values and the interface component values may vary depending upon the telephone system and local requirements.

For the system shown in FIG. 2, the low frequency matching circuit 26 is configured as follows. The transformer shunt magnetizing inductance L2 (approximately 4 Henrys) causes a low frequency lead which is a short circuit at DC and increases in impedance as frequency increases about a few hertz. The components R72, R71, C29 are configured to produce lead-lag compensation to approximate the low frequency response of the transformer. The values of these components are chosen to match the frequency response of the transformer.

In the high frequency matching circuit 24, the capacitor C16 simulates the shunt capacitor C25. The inductor L11 approximates the leakage inductance L1 of the transformer T1. The capacitor C21 simulates the capacitors C23, C24. The capacitor C27 and resistor 70 simulate the telephone line capacitance Cl and resistance R4. The resistor R73 simulates resistor R66 and resistor R55 simulates telephone line resistor R3. Resistor R53 simulates matching resistor R57. The actual values of the circuit components of the high frequency circuit are ratiometrically determined relative to the actual values of the interface circuit and telephone line. For example, the value of the two inductances $L_1$ (which represent the series leakage inductance of the transformer) is 16 mH. A reasonably close stock inductor having a value of 10 mH may be utilized which results in a ratio of 1.6:1. This ratio is then utilized to determine the remaining component values of the high frequency matching circuit. Once the transhybrid circuit is configured as described, it may be adapted for use with other telephone systems having different characteristics by replacing individual circuit components to ratiometrically match any new component values of the telephone system without the necessity of tuning the circuit.

Overall, the low frequency network is configured to simulate or match the reactive or complex elements of the interface circuit and telephone line at the low frequency range and the high frequency circuit similarly matches or simulates the interface circuit and telephone line at the high frequency range.

It should be noted that the value of the DC blocking capacitor C22 as required by the telephone line provider may produce a resonance peak frequency which increases the difficulty of matching the transhybrid rejection circuit to the interface circuit and telephone line. Increasing the size of capacitor C22 will reduce the resonance peak frequency which if low enough is below the low frequency response of the transformer thereby facilitating the matching of the transhybrid rejection circuit.

In the configuration shown, a high level of transhybrid rejection or attenuation in the order of 15–20 db is achieved over the required frequency range. Such a degree of cancellation accommodates the high gain application of an elevator intercom.

As can be seen, a modem has been described which achieves increased transhybrid rejection over the frequency range required for voice intercom to an elevator car and which is adaptable to varied telephone line characteristics.

As will be apparent to persons skilled in the art, various modifications and adaptations of the structure above described will become readily apparent without departure from the spirit and scope of the invention, the scope of which is defined in the appended claims.

What is claimed is:

1. A modem for connection to a telephone line comprising:

a transmit circuit connected through a resistor to a junction, a receive circuit, a telephone line interface circuit connecting said junction to a telephone line, said interface circuit comprising first and second groups of reactive circuit components, a transhybrid cancellation circuit having a first high frequency matching circuit connected to said transmit circuit and configured to simulate said first group of reactive components of said interface circuit over a predetermined high frequency range to provide transhybrid rejection over said high frequency range, a second low frequency matching circuit connected to said first high frequency matching circuit and configured to simulate said second group of reactive components of said interface circuit and a connected telephone line over a predetermined low frequency range to provide transhybrid rejection over said low frequency range, an inverting amplifier connected to said second low frequency matching circuit, and a summing circuit responsive to the output of said inverting amplifier and to said junction, said summing circuit connected to the input of said receive circuit.

2. The device of claim 1 wherein said first high frequency matching circuit comprises inductive and capacitive components.

3. The device of claim 2 wherein said second low frequency matching circuit comprises capacitive components.

4. The device of claim 1 wherein said interface circuit has a transformer with a magnetizing inductance component and said second low frequency matching circuit is configured to approximately match said magnetizing inductance component over said predetermined low frequency range.

5. The device of claim 4 wherein said second low frequency circuit is a lead-lag network.

6. The device of claim 4 wherein said transformer has a leakage inductance component and said first high frequency matching circuit is configured to approximately match said leakage inductance component over said predetermined high frequency range.

7. The device of claim 4 wherein said interface circuit has a shunt capacitor component connected to said transformer and said second low frequency matching circuit is configured to approximately match said shunt capacitor component over said predetermined low frequency range.

8. The device of claim 1 wherein said low frequency range is about 10–500 Hertz.

9. The device of claim 1 wherein said high frequency range is about 500–3500 Hertz.

* * * * *